Dec. 8, 1959   C. J. TURANSKY ET AL   2,916,046
CHATTER-FREE CHECK VALVE
Filed June 20, 1956

INVENTORS
CLEMENT J. TURANSKY
AND SYLVESTER J. PIRRONE
BY
ATTORNEYS

United States Patent Office 2,916,046
Patented Dec. 8, 1959

2,916,046

CHATTER-FREE CHECK VALVE

Clement J. Turansky, Tonawanda, and Sylvester J. Pirrone, Buffalo, N.Y., assignors to the United States of America as represented by the Secretary of the Air Force Application June 20, 1956, Serial No. 592,698

1 Claim. (Cl. 137—496)

The invention relates to improvements in check valves and, as illustrated herein, relates more particularly to chatter-free check valves useful in the power plant of rocket aircraft to control the flow of high pressure, high temperature fluids such as water and alcohol from the fuel tanks to the rocket engine.

The valve illustrated herein is designed to be placed in the fuel supply line between the fuel tanks and the rocket engine. Under some conditions, fuel pressure may drop and unless a proper check valve is placed in the fuel line, there could be flash backs from the burner and into the fuel tank line which might cause a serious fire with possible loss of both plane and pilot. It is essential, therefore, to provide a construction wherein the valve is certain to close as soon as there is a substantial difference in pressure in the inlet and outlet ports of the check valve. If the fluid pressure decreases substantially, then the check valve must close to prevent a flash back from the rocket engine through the fuel pumps and possibly in the fuel tanks.

The illustrated valve provides a safe and positive opening of the flow path and insures against chattering of the poppet valve and piston when fluid pressures at the inlet and outlet ports of the valve are substantially equal. This chatter-free and positive opening of the valve eliminates the costly replacement of a conventional check valve in a rocket power plant which is usually necessary because of shattering of the poppet caused by violent oscillations when inlet and outlet pressures are substantially equal.

An object of the invention is to provide an improved check valve which will conduct a controlled amount of fluid such as a mixture of liquid and gaseous matter under high pressure and temperature from one location in a structure to another without chattering or oscillation of the movable parts thereof.

A further object of this invention is to provide a construction which will be effective to prevent oscillation due to rapidly changing internal valve pressures.

These and other advantages, features and objects of the invention will become more apparent from the following description taken in connection with the accompanying drawings, wherein.

Figure 1:
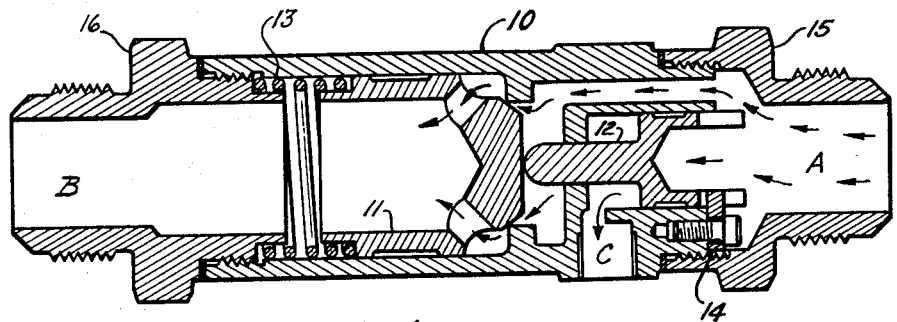
Fig. 1 is a view in longitudinal section of a preferred embodiment of the present invention.

Referring to Fig. 1, the body of the valve 10 consists of a substantially cylindrical member having a port A as the inlet and port B as the outlet and is located between the fuel pumps and the rocket engine. Two threaded members 15 and 16 are fastened to the ends of the valve body 10. A valve body 11 is inserted into its operating position in a structure prior to threading the member 16 to the end of the valve body 10.

Within the body of the valve 10, there is located a booster piston 12 of unique shape and design and a poppet assembly 11. Also, attached to the valve body 10 is a retainer 14 inserted for the purpose of limiting the travel and rotation of the piston 12 within the bore of its cylindrical housing. Movement of the piston 12 toward the left as viewed in Fig. 1 urges the poppet 11 away from its seat which in turn compresses spring 13. On the release of the pressure which originally caused the movement of the piston 12, said compression spring 13 forces the poppet 11 back against the stem of the piston 12 until the poppet 11 is back in its normally closed position at rest. Also in Fig. 1, there is shown a bleed port C through which pressurized fluid leaking past said piston 12 may pass.

Figure 2:
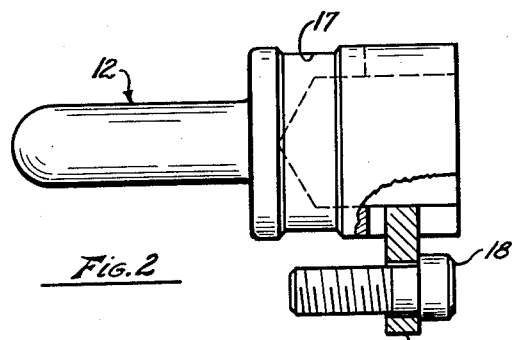
Fig. 2 is an enlarged view, partly in section, of the piston head and stem, including the retainer and retainer screw shown in Fig. 1.

Fig. 2 illustrates a more detailed view of the piston 12 showing the retainer 14 held in place by a screw 18. Retainer 14 is used to hold the piston 12 in position in the valve bore and the under cut groove 17 is for the purpose of reducing the sliding friction between the valve bore and the piston 12.

Figure 3:
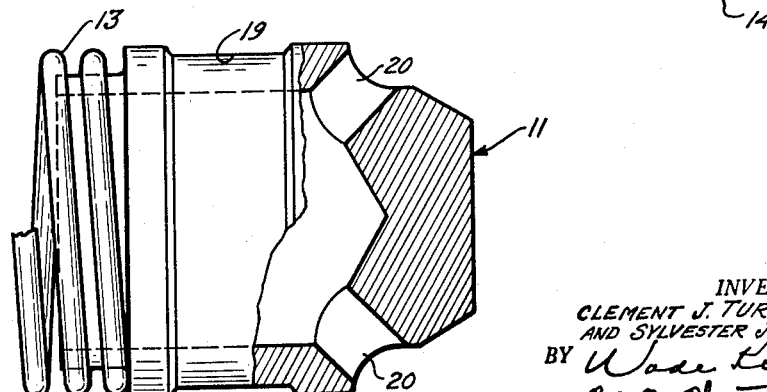
Fig. 3 is an enlarged view, partly in section, of the poppet head and skirt design shown in Fig. 1.

In Fig. 3, there is shown an enlarged detailed view of the poppet assembly 11. Pressurized fluid passes through the holes 20 after the booster piston 12 has caused said poppet 11 to move from its seat to an intermediate or open position in the valve body 10. Also interacting with said poppet 11 is a return spring 13 which returns the poppet to its seated position on the release of pressure in the system. Undercut 19 is machined in the poppet 11 for the purpose of reducing surface friction.

The operation of the above-described and illustrated embodiment of the invention will now be described.

As the fluid pressure at port A reaches a predetermined level, the piston 12 moves toward the left and toward the outlet port B, as viewed in Fig. 1, forcing the poppet 11 from its seat and compresses the spring 13. As the poppet 11 leaves its seat, the pressurized fluid begins to flow through the openings 20 in the head of said poppet 11 and into the bore of the valve until the pressure at outlet port B reaches a value substantially equal to that which is present at port A.

For example, when the pressure at inlet port A reaches 250 p.s.i., there is 250 p.s.i. acting on the piston head as well as 250 p.s.i. acting on the inlet side of the poppet. The pressure causes the poppet to move to the open position where it remains; the pressure at port B reaching 249.5 p.s.i. Thus there is a 250 p.s.i. pressure acting on the inlet side of the poppet plus the pressure acting on the uniquely designed piston. Reacting on the outlet side of the poppet 11 is the pressure of 249.5 p.s.i. plus a relatively small mechanical spring force. Thus, the areas against which pressure is applied to move piston 12 to open position are substantially greater than the surface area of the poppet 11 against which back pressure is applied. The difference between these pressure areas insures that the check valve will remain open so that positive and chatter-free operation will result.

The valve is also provided with an outlet port C such that any pressurized fluid which leaks by the booster piston 12 is released through said port C thus reducing the pressure ahead of the piston to a point substantially at the atmospheric level. In a typical application where the rate of flow of the pressurized fluid is 90 c.f.m., the leakage at port C amounts to 3.0 c.f.m. This feature prevents any build up of pressure in front of the booster piston 12 which would reduce the force which is exerted on the poppet 11 by said piston 12, thereby reducing the efficiency of the valve.

When the pressure at inlet port A drops below a predetermined value, the spring 13 forces the poppet 11 to return to its seat and the valve closes without any chattering.

Although the invention has been described with particular reference to an embodiment, it will be understood to those skilled in the art that various changes and modifications can be made therein without departing from the invention.

Having thus described our invention, what we claim as new and desire to secure by Letters Patent of the United States is:

An improved check valve for controlling the flow of high pressure, high temperature fluids, comprising an inclosing casing having an inlet port and an outlet port, a poppet valve formed from a single piece of heat resistant material mounted in said casing and biased for movement in a direction opposed to the direction of normal flow of fluid through said casing and arranged normally to close the passage between the inlet and outlet ports, an auxiliary cylindrical bore section formed in said casing, one end of said auxiliary bore communicating with said inlet port and the other end having a low pressure passage extending therefrom to a suitable receptacle, a separate movable piston member slidably mounted in said auxiliary cylindrical bore, the working area on the inlet side of said poppet valve being substantially greater than the corresponding area of said movable piston member such that said areas on the inlet side are greater than the area on the outlet side of the poppet, and means for retaining said piston in said cylinder including a retainer held in place by a screw member, said separate movable piston being provided with a stem portion for engaging the inlet side of said poppet valve thereby assisting in the movement of said poppet valve to open position on the application of a predetermined fluid pressure at the inlet port.

References Cited in the file of this patent

UNITED STATES PATENTS

| Number | Name | Date |
|---|---|---|
| 965,052 | Wainwright | July 19, 1910 |
| 1,916,767 | Mason | July 4, 1933 |
| 2,069,522 | Flournoy | Feb. 2, 1937 |
| 2,318,963 | Parker | May 11, 1943 |
| 2,516,247 | Nueneman | July 25, 1950 |
| 2,682,890 | May | July 6, 1954 |
| 2,797,705 | Frantz | July 2, 1957 |